United States Patent
Oh et al.

(10) Patent No.: US 8,149,957 B2
(45) Date of Patent: Apr. 3, 2012

(54) APPARATUS AND METHOD FOR INTERFERENCE CANCELLATION IN A BROADBAND WIRELESS COMMUNICATION SYSTEM

(75) Inventors: Jeong-Tae Oh, Yongin-si (KR); Myung-Kwang Byun, Suwon-si (KR); Jae-Ho Jeon, Seongnam-si (KR); Seung-Joo Maeng, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 976 days.

(21) Appl. No.: 12/061,146

(22) Filed: Apr. 2, 2008

(65) Prior Publication Data
US 2008/0240304 A1 Oct. 2, 2008

(30) Foreign Application Priority Data
Apr. 2, 2007 (KR) .................. 10-2007-0032307

(51) Int. Cl.
*H04L 27/06* (2006.01)
(52) U.S. Cl. ........ 375/340; 375/260; 375/262; 375/267; 375/346; 375/347; 375/348
(58) Field of Classification Search .................. 375/340, 375/260, 262, 267, 343, 346, 347, 348; 370/203, 370/304, 205, 207, 208, 209, 210
See application file for complete search history.

(56) References Cited

U.S. PATENT DOCUMENTS

| 7,372,896 | B2* | 5/2008 | Bjerke et al. .................. 375/148 |
| 7,421,041 | B2* | 9/2008 | Khandekar et al. ........... 375/316 |
| 7,555,067 | B2* | 6/2009 | Jeong ............................. 375/340 |
| 7,742,444 | B2* | 6/2010 | Mese et al. .................... 370/318 |
| 2007/0049199 | A1* | 3/2007 | Lim et al. ...................... 455/63.1 |
| 2008/0176577 | A1* | 7/2008 | Bourlas et al. ................ 455/454 |

FOREIGN PATENT DOCUMENTS

| KR | 2000-0071166 A | 11/2000 |
| KR | 10-2003-0053131 A | 6/2003 |
| KR | 10-2006-0040263 A | 5/2006 |
| WO | 2007/012538 A1 | 2/2007 |

\* cited by examiner

*Primary Examiner* — Dhaval Patel
(74) *Attorney, Agent, or Firm* — Jefferson IP Law, LLP

(57) ABSTRACT

An apparatus and a method for interference cancellation in a broadband wireless communication system are provided. A receiving apparatus includes an estimator, a channel compensator, and a demodulator. The estimator estimates channels of a desired signal and at least one interference signal, estimates noise, calculates a mean interference power of each interference signal, and calculates a mean noise power. The channel compensator channel-compensates burst data. The demodulator calculates a noise variance value by adding the mean noise power to the at least one mean interference power and creates Log Likelihood Ratio (LLR) by demodulating the channel-compensated data.

35 Claims, 8 Drawing Sheets

PUSC SUBCHANNEL – TILE

FIG.3A

AMC SUBCHANNEL – SLOT

FIG.3B

APPARATUS AND METHOD FOR INTERFERENCE CANCELLATION IN A BROADBAND WIRELESS COMMUNICATION SYSTEM

PRIORITY

This application claims the benefit under 35 U.S.C. §119 (a) of a Korean patent application filed in the Korean Intellectual Property Office on Apr. 2, 2007 and assigned Serial No. 2007-32307, the entire disclosure of which is hereby incorporated by reference.

BACKGROUND OF THE INVENTION

1. Field of the Invention

The present invention relates to a receiving apparatus and method in a wireless communication system. More particularly, the present invention relates to an apparatus and method for canceling neighbor sector or cell interference in a broadband wireless communication system.

2. Description of the Related Art

In general, mobile wireless communication systems were developed for the purpose of providing voice service. Over time, such wireless communication systems have been further developed to also provide packet data service and various multimedia services as well as voice service. Because the systems that can provide a wireless packet data service as described above were realized during a third generation of system development, they are known as 3rd-Generation (3G) mobile communication systems. The 3G mobile communication systems have been further developed to provide a diversity of multimedia services at high speed. The 3G mobile communication systems distinguish users using a Code Division Multiple Access (CDMA) scheme. The CDMA scheme distinguishes channels by allocating a different code to each user such that each code is orthogonal to codes transmitted to other users.

However, the 3G mobile communication systems are limited in that they cannot provide higher-speed data with high quality because of a shortage of codes, etc. That is, a transmission rate is limited because the number of available codes is limited. To address this limitation, research and development is currently underway on 4th-Generation (4G) broadband wireless communication systems which are so-called future-generation communication systems. The 4G broadband wireless communication systems can classify users or channels using an Orthogonal Frequency Division Multiple Access (OFDMA) scheme. With these advanced features, the 4G broadband wireless communication systems can increase a transmission rate up to about 100 Mbps. Thus, the 4G broadband wireless communication systems can provide services having more diverse Qualities of Service (QoS) than the 3G systems.

Current 4G communication systems have been developed to ensure mobility and QoS in Broadband Wireless Access (BWA) communication systems such as wireless Local Area Network (LAN) systems and wireless Metropolitan Area Network (MAN) systems. Their typical communication systems can be Institute of Electrical and Electronics Engineers (IEEE) 802.16d communication systems and IEEE 802.16e communication systems, for example. In addition, various types of systems using an Orthogonal Frequency Division Multiplexing (OFDM) scheme have been developed.

As described above, a broadband wireless communication system can basically use the OFDMA scheme, ensure mobility, and allow all cells to use the same frequency to enhance frequency efficiency.

FIG. 1 is a schematic diagram illustrating a conventional multi cell based BWA system.

Referring to FIG. 1, in a conventional multi cell system, a serving Base Station 0 (BS0) 100, a neighboring BS1 101, and a neighboring BS2 102 perform communication using the same frequency. That is, the multi cell system has a frequency reuse factor of 1 and can therefore enhance frequency efficiency. However, such frequency reuse may also suffer fatal degradation of performance because of inter-cell or inter-sector interference.

For example, when a Mobile Station (MS) 103 in the serving BS0 100 is considered, transmitted signals from an MS 104 in the neighboring BS1 101 and transmitted signals from an MS 105 in the neighboring BS2 102 act as interference signals to the serving BS0 100. That is, the serving BS0 100 receives not only a received signal 106 from the MS 103 in a corresponding cell but also interference signals 107 and 108 from the MS 104 in the neighboring BS1 101 and the MS 105 in the neighboring BS2 102, respectively. The interference signals from the neighbor cells have an influence upon the signal of the MS 103 in the corresponding cell, thus deteriorating demodulation performance. Thus, the multi cell based BWA system requires a technique for canceling neighbor cell or sector interference.

SUMMARY OF THE INVENTION

An aspect of the present invention is to address at least the above-mentioned problems and/or disadvantages and to provide at least the advantages described below. Accordingly, an aspect of the present invention is to provide an apparatus and method for canceling inter-sector or inter-cell interference in a broadband wireless communication system.

Another aspect of the present invention is to provide an apparatus and method for channel estimation taking into consideration inter-sector or inter-cell interference in a broadband wireless communication system.

A further aspect of the present invention is to provide an apparatus and method for estimating noise taking into consideration inter-sector or inter-cell interference and creating a Log Likelihood Ratio (LLR) using the estimated noise in a broadband wireless communication system.

Yet another aspect of the present invention is to provide an apparatus and method for creating an interference signal using an estimated interference channel, canceling the interference signal from a received signal, and performing demodulation in a broadband wireless communication system.

Still a further aspect of the present invention is to provide an apparatus and method for improving the reliability of an LLR created by a demodulator in a broadband wireless communication system.

The above aspects are addressed by providing an apparatus and method for interference cancellation in a broadband wireless communication system.

According to one aspect of the present invention, a receiving apparatus in a broadband wireless communication system is provided. The apparatus includes an estimator, a channel compensator, and a demodulator. The estimator estimates channels of a desired signal and at least one interference signal through a Joint Channel Estimation (JCE), estimates noise using the channel estimation values of the desired signal and the at least one interference signal, calculates a mean interference power of each interference signal using the channel estimation value of the at least one interference signal, and calculates a mean noise power using the noise estimation value. The channel compensator channel-compensates burst data using the channel estimation value of the desired signal from the estimator. The demodulator calculates a noise variance value by adding the mean noise power to the at least one mean interference power, calculates a noise variance value, and creates Log Likelihood Ratio (LLR) data by demodulating the channel-compensated data using the noise variance value.

According to another aspect of the present invention, a receiving apparatus in a broadband wireless communication system is provided. The apparatus includes an estimator, a creator, an interference canceller, and a data restoration unit. The estimator estimates a channel of an interference signal by performing a Joint Channel Estimation (JCE) in a set size unit. The creator creates an interference signal using the channel estimation value of the interference signal and decoded data of a corresponding interference burst. Depending on the JCE result, the interference canceller either cancels the created interference signal from a received signal and outputs an interference-canceled signal, or directly outputs the received signal. The data restoration unit calculates a noise variance value adds a mean noise power value for the interference-canceled signal to at least one mean interference power value acquired through the JCE, and, upon receiving an interference-noncanceled signal from the interference canceller, creates LLR data by demodulating the interference-noncanceled signal using the noise variance value.

According to a further aspect of the present invention, a receiving method in a broadband wireless communication system is provided. The method includes estimating channels of a desired signal and at least on interference signal by performing a Joint Channel Estimation (JCE) in a set size unit 1, estimating noise using the channel estimation value of the desired signal and the channel estimation value of the at least one interference signal, calculating a mean interference power of each interference signal using the channel estimation value of the interference signal and calculating a mean noise power using the noise estimation value, channel-compensating received burst data using the channel estimation value of the desired signal, calculating a noise variance value by adding the mean noise power to the at least one mean interference and demodulating the channel-compensated data using the noise variance value to create Log Likelihood Ratio (LLR) data.

According still another aspect of the present invention, a receiving method in a broadband wireless communication system is provided. The method includes estimating a channel of an interference sector by performing Joint Channel Estimation (JCE) in a set size unit, creating an interference signal using the channel estimation value of the interference sector and decoded data of a corresponding interfering sector, switching an interference cancellation operation for a received signal depending on the outcome of the JCE, calculating a noise variance value by adding a mean noise power value for an interference-canceled signal to at least one mean interference power value acquired through the JCE and decoding the received signal using the noise variance value to create LLR data for which the interference cancellation operation is switched off.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following detailed description taken in conjunction with the accompanying drawings in which:

FIGS. 3A and 3B are diagrams illustrating an exemplary subchannel structure for uplink transmission in a BWA system;

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Terms described below, which are defined considering functions in the present invention, can be different depending on user and operator's intention or practice. Therefore, the terms should be defined on the basis of the disclosure throughout this specification.

Exemplary embodiments of the present invention provide a technology for canceling inter-cell or inter-sector interference in a broadband wireless communication system.

A Broadband Wireless Access (BWA) communication system is described below. However, it is to be understood that this is for example only and that the present invention is applicable to any multi cell based communication system. Furthermore, in an exemplary embodiment of the present invention, a receiver of a Base Station (BS) is described. Again, it is to be understood that this is for example only and the present invention is applicable to all receivers, for example those in either a BS or a user terminal.

Figure 1:
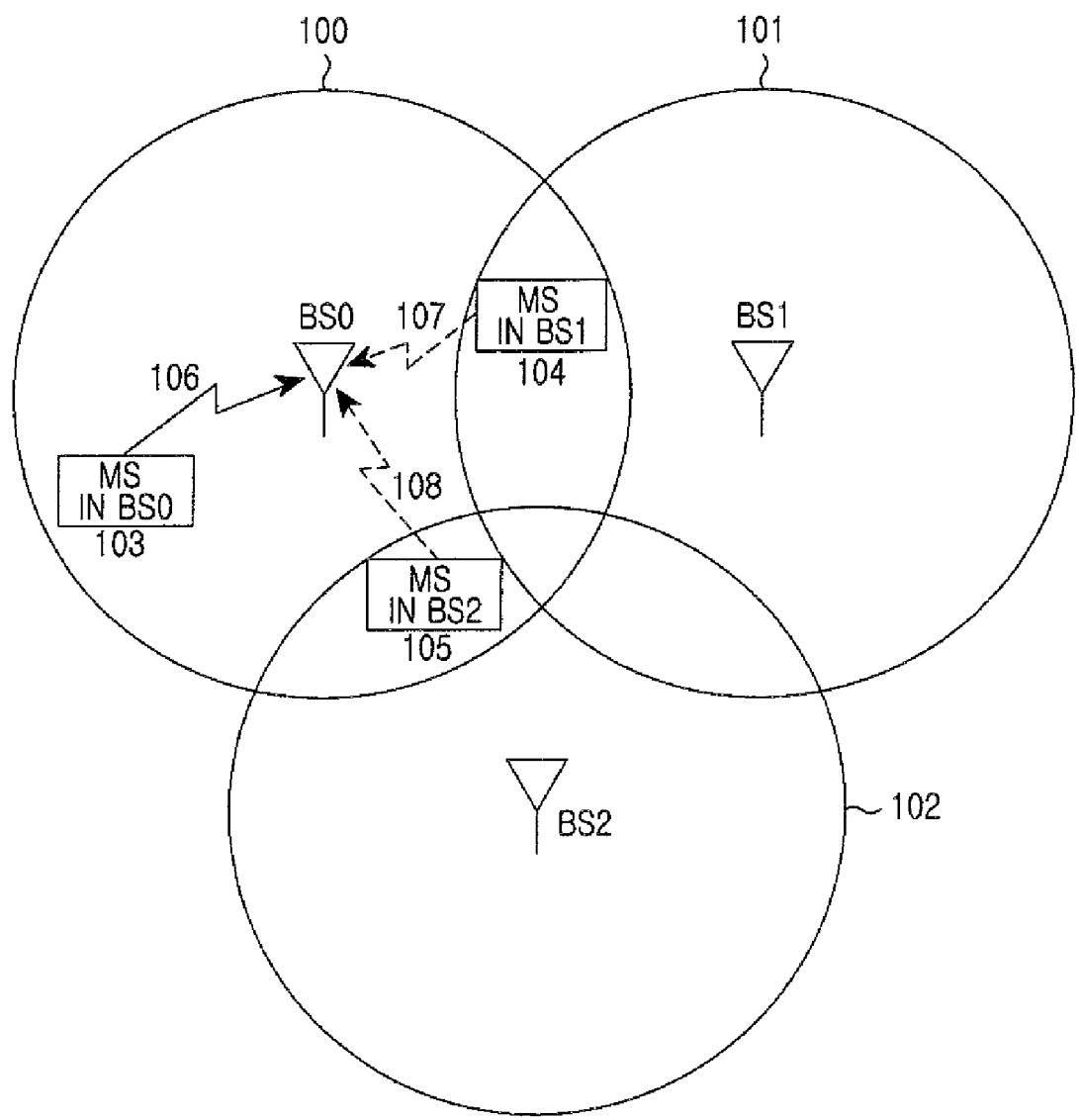
FIG. 1 is a schematic diagram illustrating a conventional multi cell based Broadband Wireless Access (BWA) system.
Figure 2:
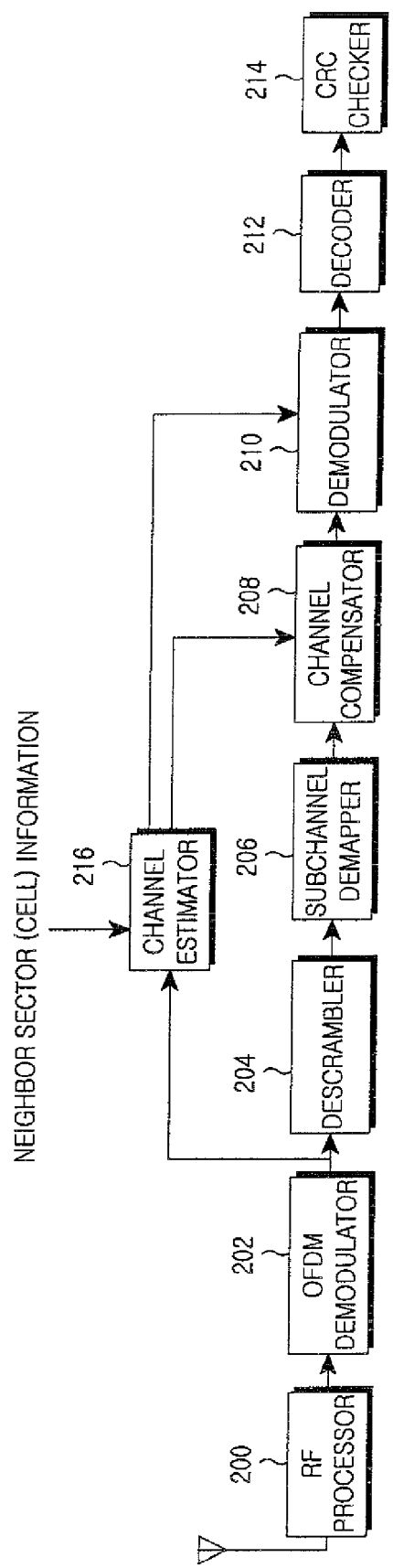
FIG. 2 is a block diagram illustrating a construction of a receiver in a BWA system according to an exemplary embodiment of the present invention.

FIG. 2 is a block diagram illustrating a construction of a receiver in a BWA system according to an exemplary embodiment of the present invention.

As shown in FIG. 2, an exemplary receiver includes a Radio Frequency (RF) processor 200, an Orthogonal Frequency Division Multiplexing (OFDM) demodulator 202, a descrambler 204, a subchannel demapper 206, a channel compensator 208, a demodulator 210, a decoder 212, a Cyclic Redundancy Check (CRC) checker 214, and a channel estimator 216. The following description refers to the canceling of inter-sector interference. It is to be understood that this is for example and description convenience only and that the invention is not so limited. For example, the invention may also be applied to the canceling of inter-cell interference.

Referring to FIG. 2, the RF processor 200 includes a filter, a frequency converter, etc. The RF processor 200 converts a Radio Frequency (RF) band signal received through an antenna into a baseband signal and converts the baseband signal into a digital signal. The high-frequency band signal received by the RF processor may include signals from MSs operating in the sector in which the receiver is operating as well as signals from MSs operating in neighboring sectors.

The OFDM demodulator 202 outputs frequency-domain data by Fast Fourier Transform (FFT)-processing the sample data received from the RF processor 200. The descrambler 204 descrambles the frequency-domain data received from the OFDM demodulator 202 using a unique code allocated to each sector.

The subchannel demapper 206 extracts burst data from the data received from the descrambler 204.

The channel estimator 216 receives burst allocation information of selected sectors (that is, sectors interfering with each other). The channel estimator 216 determines burst allocation states of the sectors by analyzing the burst allocation information of the sectors. Here, the burst allocation information can include a position and size of an allocated resource, a subchannel scheme applied, a scrambling code masked for pilot symbols, etc. The channel estimator 216 configures a 'P' matrix for Joint Channel Estimation (JCE) using a unique scrambling code allocated to each sector. The channel estimator 216 estimates a channel of a desired signal and a channel of an interference signal using received signal vector (Y) of a pilot position and the 'P' matrix. The channel estimator 216 estimates noise which actually occurs in a desired sector, using the channel estimation value of the desired signal and the channel estimation value of at least one interference signal. Here, the noise can be estimated by subtracting the estimated desired signal and interference signal from a received signal.

If channel and noise estimation for all tiles or slots is completed, the channel estimator 216 calculates a mean interference power for each interfering burst and a mean noise power for a burst seeking demodulation, calculates a noise variance value ($\sigma^2$) used for LLR creation using the calculated at least one mean interference power and mean noise power, and provides the noise variance value ($\sigma^2$) to the demodulator 210. That is, the channel estimator 216 obtains the noise variance value ($\sigma^2$) by adding at least one mean interference power value to a mean noise power value. The channel estimator 216 calculates channel values (that is, a channel values for channel compensation) for the entire subcarriers of the burst seeking demodulation and provides the channel values to the channel compensator 208.

The channel compensator 208 channel-compensates the data received from the subchannel demapper 206 using the channel values received from the channel estimator 216.

The demodulator 210 demodulates the data received from the channel compensator 208 using the noise variance value ($\sigma^2$) received from the channel estimator 216. The demodulator 210 can create LLR values for soft decision decoding.

For instance, in the case of receiving a Quadrature Phase Shift Keying (QPSK) signal, the demodulator 210 operates as expressed in Equation 1 below. In the case of QPSK, a transmitter maps a 2-bit symbol to one signal point on a constellation for transmission and a receiver calculates an LLR value using the a posteriori probability based on the assumption that any signal point on a constellation has been transmitted. Among two bits, one bit (b0) determines one of two signal points on a real axis and the other bit (b1) determines one of two signal points on an imaginary axis.

$$LLR_{b0,b1} = \log\frac{\sum_i P(r|s_i^0)}{\sum_i P(r|s_i^1)} = \log\frac{P(r|s^0)}{P(e|s^1)} = \log\frac{\exp\left(-\frac{(r-s^0)^2}{s\sigma^2}\right)}{\exp\left(-\frac{(r-s^1)^2}{s\sigma^2}\right)} \quad (1)$$

where, r: channel-compensated received signal, $s^0$ and $s^1$: signal points on constellation, and $\sigma^2$: noise variance.

For accurate calculation, Equation 1 requires substantially exact channel estimation and noise estimation. Exemplary embodiments of the present invention determine a noise variance value ($\sigma^2$) as a sum of a mean interference power value and a mean noise power value.

The decoder 212 decodes the data (that is, the LLR values) from the demodulator 210 and outputs an information bit stream. The CRC checker 214 isolates a CRC code from the information bit stream from the decoder 212, compares the isolated CRC code with a CRC code created from a received information bit stream, and determines if an error occurs.

Figures 3A, 3B:
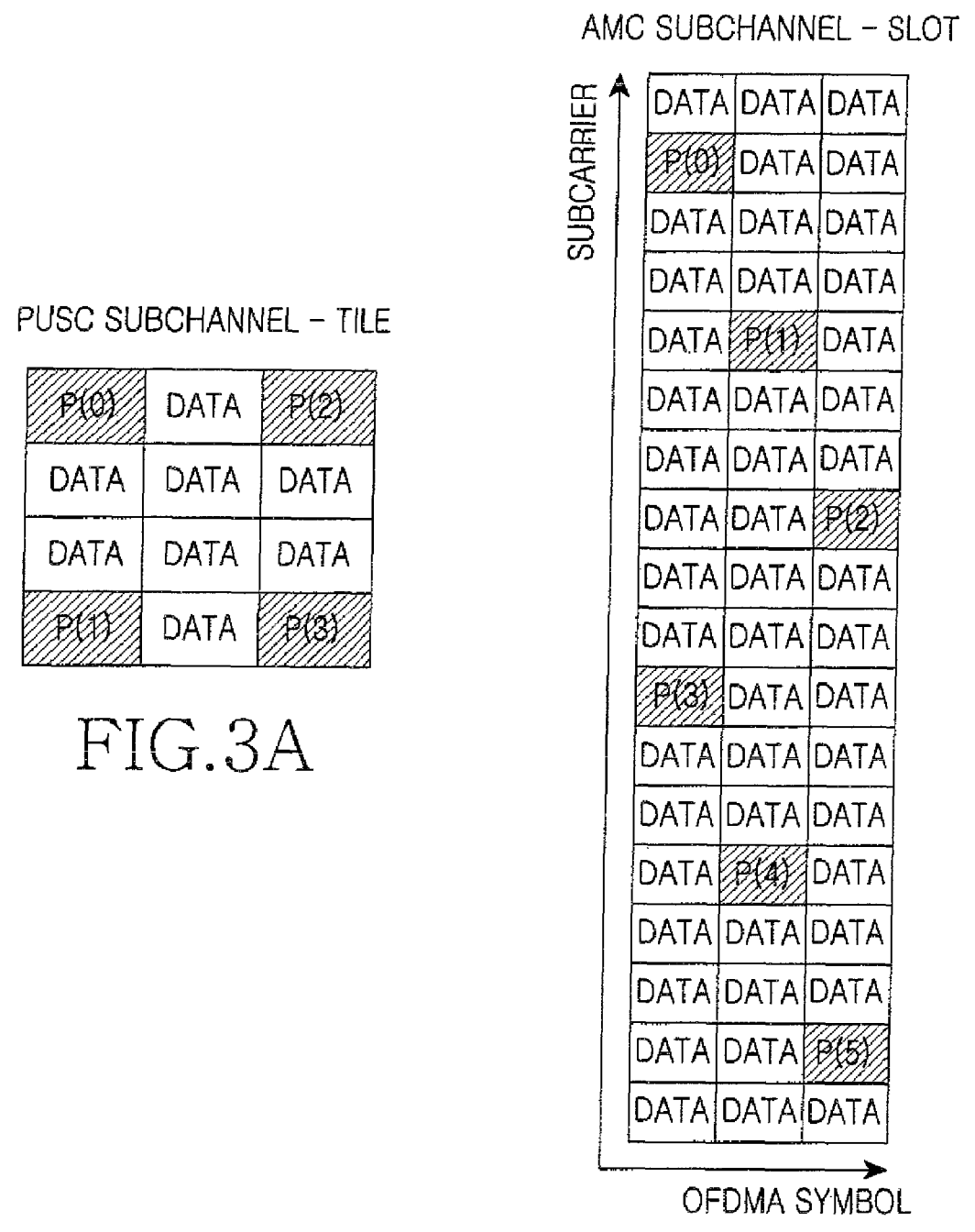

FIGS. 3A and 3B are diagrams illustrating an exemplary subchannel structure for uplink transmission in a BWA system.

FIG. 3A illustrates a tile of a Partial Usage of SubCarrier (PUSC) subchannel. FIG. 3B illustrates a slot of an Adaptive Modulation and Coding (AMC) subchannel.

As shown in FIG. 3A, one tile is comprised of 4 continuous subcarriers (tones) on the frequency axis and 3 OFDM symbols on the time axis. That is, one tile is comprised of a total of 12 tones (4 tones×3 OFDM symbols). Among them, 8 tones are data tones and 4 tones are pilot tones. The pilot tones are tones for transmitting a determined signal (a pilot signal) that is previously known by a BS and an MS. The pilot tones are also previously decided in position. A channel estimation value for 8 data symbols belonging to a tile may be calculated using 4 pilot symbols.

As shown in FIG. 3B, one slot is comprised of 18 continuous tones on the frequency axis and 3 OFDM symbols on the time axis. That is, one slot is comprised of a total of 54 tones (18 tones×3 OFDM symbols). Among them, 6 tones are pilot tones and 48 tones are data tones.

A description of the case of using the PUSC subchannel structure (that is, the tile) of FIG. 3A is made below, for example.

Because inter-sector interference, if any, may seriously deteriorate the performance of channel estimation, JCE of Equation 2 taking into consideration the inter-sector interference is performed as described below. Equation 2 is based on the assumption that number of sectors is 3.

$$P = \begin{bmatrix} P_0(0) & P_1(0) & P_2(0) \\ P_0(1) & P_1(1) & P_2(1) \\ P_0(2) & P_1(2) & P_2(2) \\ P_0(3) & P_1(3) & P_2(3) \end{bmatrix} \quad (2)$$

$$\hat{h} = (P^H P)^{-1} P^H Y$$

where 'P' denotes a matrix of scrambling patterns applied to the tile for 3 sectors, 'Y' denotes a received signal and is a vector comprised of received signal values for 4 pilot tones, and 'ĥ' denotes a vector of a channel estimation value for a corresponding tile. In each element ($P_c(k)$) of the matrix, 'c' represents a sector index (c=0~C−1) and 'k' represents an index of a pilot tone (k=0~K−1). Thus, each element ($P_c(k)$) can have a value of +1 or −1.

Depending on the number of interfering sectors and number of pilot tones in a channel estimation unit, the variables of Equation 2 are generalized as follows:

P=[number of pilot tones×number of interfering sectors] matrix,

Y=[number of pilot tones] vector, and

ĥ=[number of interfering sectors] vector.

A channel estimation value for each interfering sector is acquired for every tile through channel estimation using Equation 2. If there is no inverse matrix (($P^H P)^{-1}$), no channel estimation value is obtainable. In the case of using 4 pilot tones (K=4), the probability of no inverse matrix is 12.5% for 2 sectors (C=2) and the probability of no obtainable inverse matrix is 34.4% for 3 sectors (C=3). Thus, the number of tiles for which channel estimation cannot be performed is decided depending on the probability. With 4 pilot tones, only the maximum 4 sectors (C=4) can be distinguished and in this case, the probability of no obtainable inverse matrix is 59.0%. If there is no inverse matrix, it is required to use a general channel estimation technique taking into consideration only a desired signal. Thus, an appropriate switching must be made between the general channel estimation technique and the JEC technique of Equation 2 depending on the existence or absence of the inverse matrix.

Figure 4:
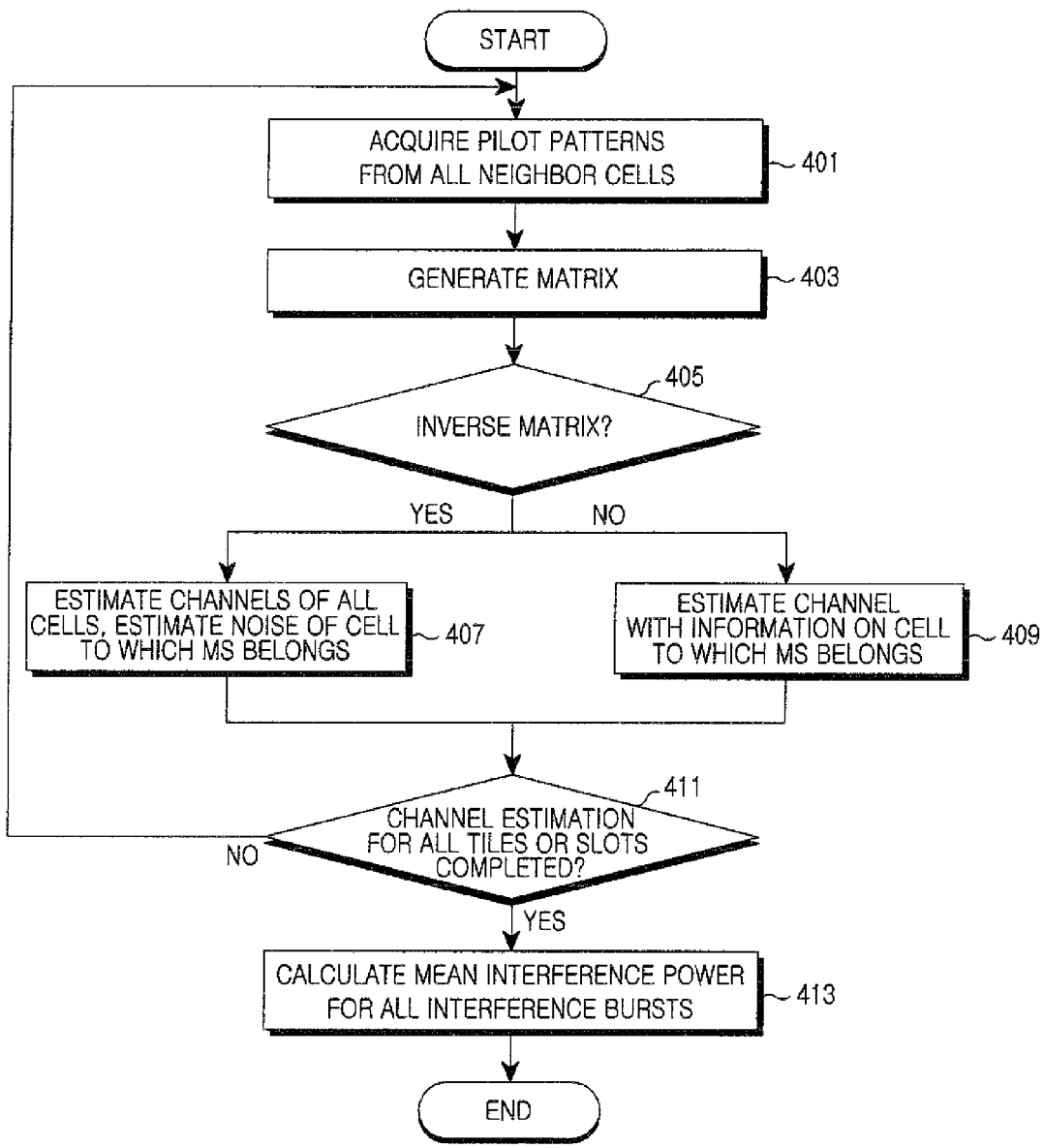
FIG. 4 is a flow diagram illustrating a process of a receiver in a BWA system according to an exemplary embodiment of the present invention.

FIG. 4 is a flow diagram illustrating a process of a receiver in a BWA system according to an exemplary embodiment of the present invention. Particularly, FIG. 4 shows a process of a channel and noise estimation operation implemented in a channel estimator 216.

Referring to FIG. 4, in step 401, the receiver acquires pilot patterns of a desired sector and an interfering sector for a $k^{th}$ tile (or a $k^{th}$ slot). Here, the pilot pattern signifies the inclusion of a position of a pilot symbol and a scrambling code masked for pilot symbols.

After the pilot patterns for a desired signal and an interference signal for the $k^{th}$ tile are acquired, the receiver configures a 'P' matrix for JEC using the acquired pilot patterns in step 403. In an exemplary implementation, the receiver configures a 'P' matrix using Equation 2 with pilot scrambling codes that are used in the desired sector and the interfering sector.

In step 405, the receiver calculates a matrix ($P^H P$) and determines whether there is the inverse matrix ($P^H P)^{-1}$. If there is the inverse matrix ($P^H P)^{-1}$, the receiver performs the JEC of Equation 2 to estimate all channels of the desired signal and the interference signal in step 407. That is, the receiver acquires channel estimation values of the desired signal and the interference signal on a per-tile basis and estimates noise, which is actually generated, using the acquired channel estimation values of the desired signal and the at least one interference signal. If there is no inverse matrix, in step 409, the receiver acquires a channel estimation value of a desired signal using a general channel estimation technique without taking into consideration interference. That is, the receiver acquires a channel estimation value using only a pilot pattern of a desired sector or cell.

In step 411, the receiver determines whether channel estimation is completed for all tiles or slots included in a burst seeking demodulation. If a tile for channel estimation remains, the receiver returns to step 401 and again performs the subsequent steps to perform channel estimation for a next tile. If the channel estimation is otherwise completed for all the tiles, in step 413, the receiver calculates a mean interference power of each interference signal using the channel estimation value of the interference signal for each tile and calculates a mean noise power using the noise estimation value for each tile. In an exemplary implementation, the interference signal can be determined to have an interference level that is greater than or equal to T×noise level. Here, 'T' denotes a preset value. As such, the receiver acquires a mean interference power of each interference signal, a mean noise power, and a channel estimation value of a desired signal for channel compensation on a per-tile basis, for a burst seeking demodulation.

Figure 5:
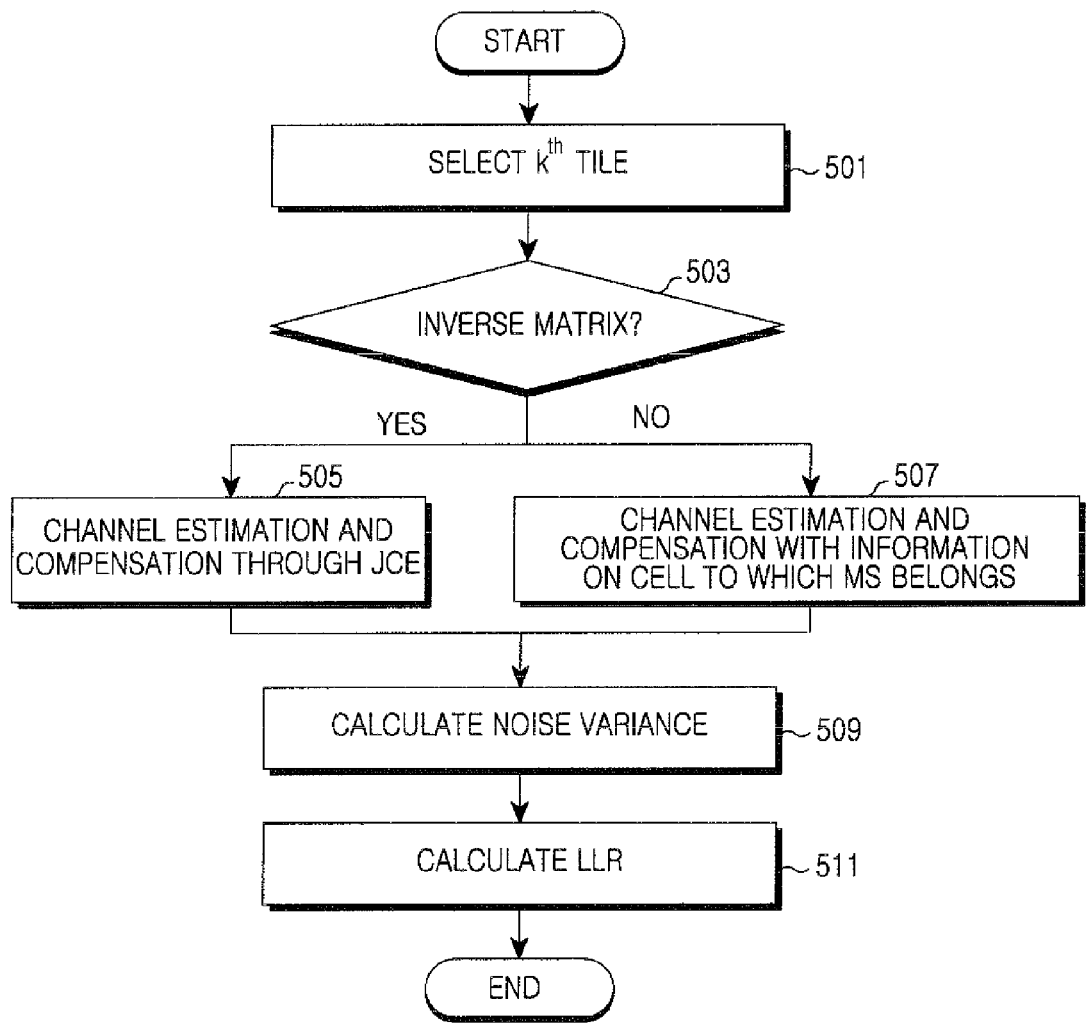
FIG. 5 is a flow diagram illustrating a process of a receiver in a BWA system according to an exemplary embodiment of the present invention.

FIG. 5 is a flow diagram illustrating a process of a receiver in a BWA system according to an exemplary embodiment of the present invention. Particularly, FIG. 5 shows a detailed process of channel compensation and LLR calculation performed in a channel compensator and a demodulator.

Referring to FIG. 5, in step 501, the receiver selects received data of a $k^{th}$ tile (or a $k^{th}$ slot) of a burst seeking demodulation.

Then, the receiver determines whether there is an inverse matrix ($P^H P)^{-1}$ of a matrix ($P^H P$) for the $k^{th}$ tile in step 503. Whether there is an inverse matrix ($P^H P)^{-1}$ of the matrix ($P^H P$) for the $k^{th}$ tile can be identified in a channel estimation step as described in FIG. 4. If there is an inverse matrix, in step 505, the receiver channel-compensates data of the $k^{th}$ tile using a channel estimation value of a desired signal that is acquired through the inverse matrix. If there is no inverse matrix, in step 507, the receiver channel-compensates data of the $k^{th}$ tile using a channel estimation value of a desired signal that is acquired through a general channel estimation technique taking into consideration only the desired signal.

After the channel compensation is performed, the receiver calculates a noise variance value ($\sigma^2$) used for LLR creation in step 509. In cases where there is an inverse matrix, the noise variance value can be calculated by adding the mean noise power value of FIG. 4 to all of mean interference power values of corresponding interference signals. If there is no inverse matrix, the receiver acquires a noise value by subtracting a channel estimation value of a desired signal from a received signal and calculates the noise variance value using the acquired noise values for a corresponding burst. In another example, in cases where there is no inverse matrix, the noise variance value can be determined by calculating noise value using a difference between two neighbor pilot symbols and calculating a mean square of the calculated noise values for a corresponding burst.

After the noise variance value is calculated as above, in step 511, the receiver creates LLR data by demodulating the channel-compensated data of the $k^{th}$ tile with the noise variance value. In the case of a QPSK signal, an LLR value can be calculated using Equation 1, for example. Such operation is repeatedly performed until all LLR data of tiles constituting a corresponding burst are created.

A method for enhancing reception performance of a receiver through channel and noise estimation taking into consideration interference has been described above in an exemplary embodiment of the present invention. In addition to this technology, the reception performance of the receiver can be enhanced by directly creating an interference signal and canceling interference. An exemplary technology for directly canceling interference is described below.

Figure 6:
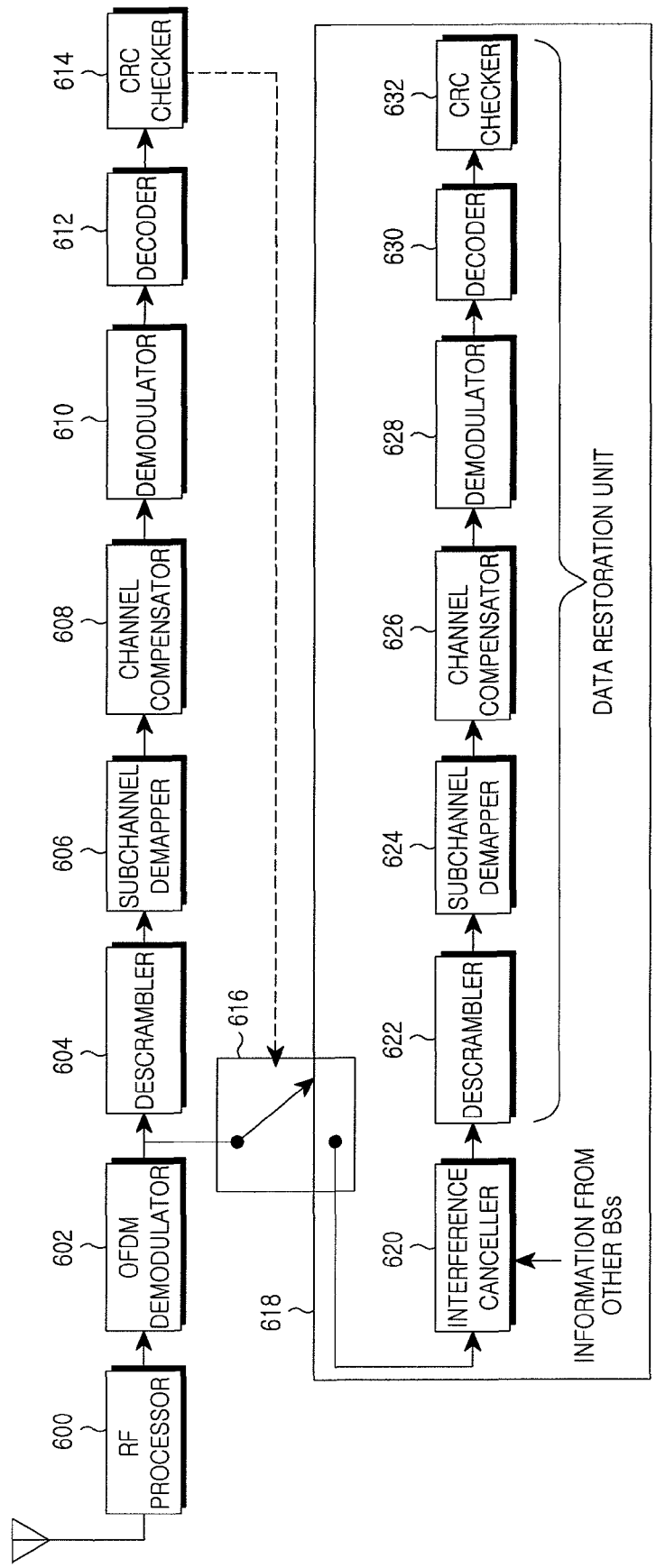
FIG. 6 is a block diagram illustrating a construction of a receiver in a BWA system according to another exemplary embodiment of the present invention.

FIG. 6 is a block diagram illustrating a construction of a receiver in a BWA system according to another exemplary embodiment of the present invention.

As shown in FIG. 6, the receiver includes an RF processor 600, an OFDM demodulator 602, a descrambler 604, a subchannel demapper 606, a channel compensator 608, a demodulator 610, a decoder 612, a CRC checker 614, a switch 616, and an interference controller 618. The interference controller 618 includes an interference canceller 620, a descrambler 622, a subchannel demapper 624, a channel compensator 626, a demodulator 628, a decoder 630, and a CRC checker 632. The following refers to the canceling intersector interference. It is to be understood that this is for example and description convenience only and that the invention is not so limited. For example, the invention may also be applied to the canceling of inter-cell interference.

Referring to FIG. 6, the RF processor 600 includes a filter, a frequency converter, etc. The RF processor 600 converts a Radio Frequency band signal received through an antenna into a baseband signal and converts the baseband signal into a digital signal. The high-frequency band signal received by the RF processor may include signals from MSs operating in the sector in which the receiver is operating as well as signals from MSs operating in neighboring sectors. The OFDM demodulator 602 outputs frequency-domain data by Fast Fourier Transform (FFT)-processing sample data received from the RF processor 600. The descrambler 604 descrambles the frequency-domain data received from the OFDM demodulator 602 with a unique code allocated to each sector. The subchannel demapper 606 extracts data of a burst seeking demodulation from the data received from the descrambler 604.

The channel compensator 608 estimates a channel for the burst and channel-compensates the burst data received from the subchannel demapper 606 using the channel estimation value. Here, the channel estimation is a general channel estimation taking into consideration only a desired signal. The demodulator 610 demodulates the data received from the channel compensator 608. The demodulator 610 can create an LLR values for soft decision decoding. The decoder 612 decodes the data received from the demodulator 610 and outputs an information bit stream. The CRC checker 614 isolates a CRC code from the information bit stream received from the decoder 612, compares the isolated CRC code with a CRC code created from a received information bit stream, and performs an error determination. If it is determined that an error occurs in a corresponding burst, the CRC checker 614 controls the switch 616 to enable the interference controller 618.

The switch 616 performs switching under the control of the CRC checker 614 and provides the data received from the OFDM demodulator 602 to the interference canceller 620 of the interference controller 618.

The interference canceller 620 estimates a channel of an interference signal using burst allocation information of selected sectors and creates an interference signal using the estimated channel estimation value of the interference signal and decoded data (that is, interference bursts decoded bits) of a corresponding interfering sector. The interference canceller 620 subtracts the interference signal from a received signal (that is, an OFDM demodulated signal) and generates an interference-canceled signal. A description of a construction of an exemplary interference canceller 620 will be made later in detail with reference to FIG. 7.

The descrambler 622 to the CRC checker 632 may together comprise a data restoration unit that restores the interference-canceled signal from the interference canceller 620 to an information bit stream. Operations of the descrambler 622 to the CRC checker 632 are the same as those of the descrambler 604 to the CRC checker 614 and therefore, their detailed descriptions are omitted.

In an exemplary embodiment of FIG. 6 as described above, the interference controller 618 is enabled when the CRC checker 614 determines that there is an error. However, in another exemplary embodiment, the interference controller 618 can be always enabled irrespective of the determination result of the CRC checker 614. That is, if the CRC checker 614 determines that there is no error, the interference controller 618 can calculate and provide only a burst Carrier to Interference and Noise Ratio (CINR) to an upper controller.

Figure 7:
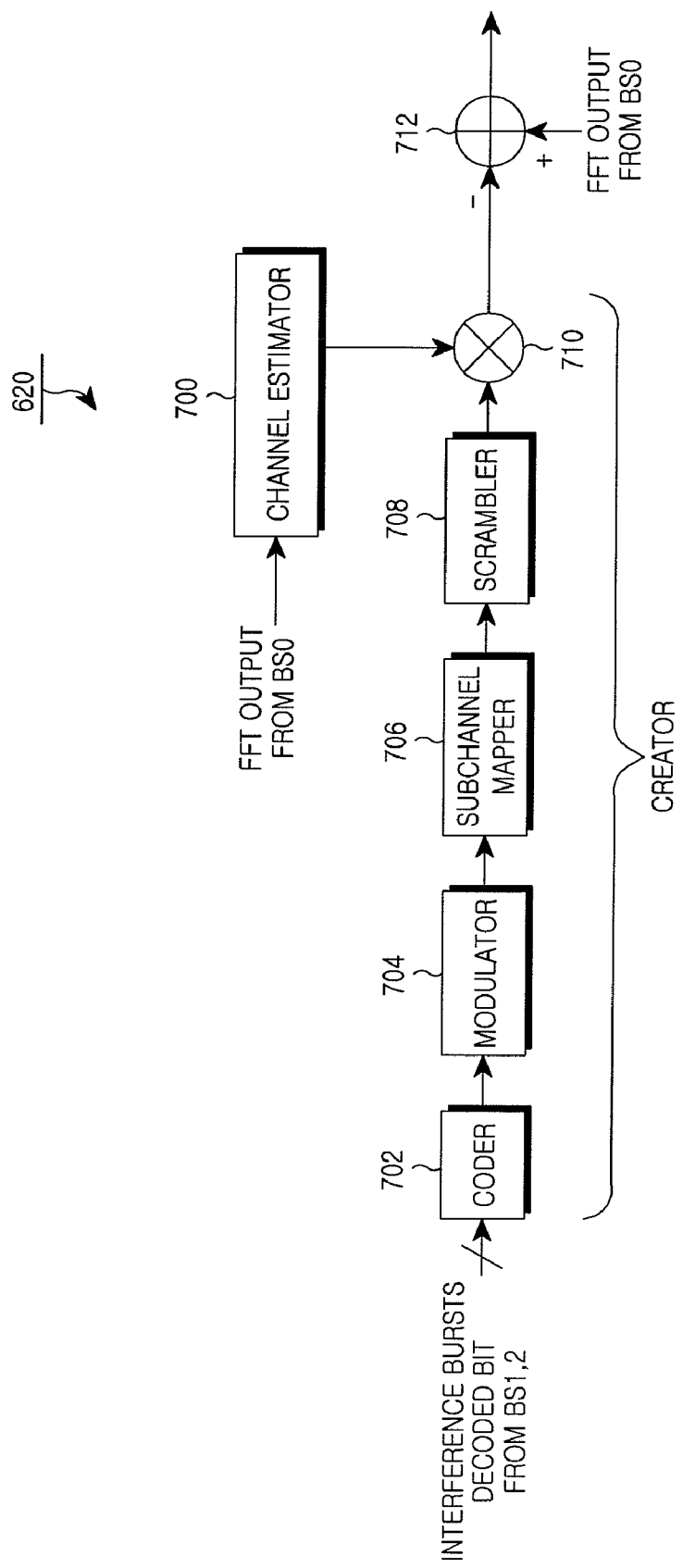
FIG. 7 is a block diagram illustrating a detailed construction of an exemplary interference canceller.

FIG. 7 is a block diagram illustrating a detailed construction of an exemplary interference canceller 620 in the construction of FIG. 6.

As shown in FIG. 7, an exemplary interference canceller 620 includes a channel estimator 700, a coder 702, a modulator 704, a subchannel mapper 706, a scrambler 708, a multiplier 710, and a subtracter 712. The coder 702, modulator 704, subchannel mapper 706, scrambler 708, and multiplier 710 together may comprise a creator for creating an interference signal using the channel estimation value of the interference signal and decoded data of a corresponding interference burst.

Referring to FIG. 7, the channel estimator 700 receives burst allocation information of selected sectors (that is, sectors interfering with each other) and configures a 'P' matrix for JCE using the burst allocation information of the sectors. The burst allocation information can include a position and size of an allocated resource, a subchannel scheme applied, a scrambling code masked for pilot symbols, etc. The channel estimator 700 estimates a channel of an interference signal by performing the JCE using received data in a set size unit of a pilot position and the P matrix, and provides the channel estimation value of the interference signal to the multiplier 710. The set size unit may be at least one of at least one tile and at least one slot. As mentioned above, the channel estimator 700 can estimate noise using a channel estimation value of a desired signal estimated through the JCE and a channel estimation value of at least one interference signal estimated through the JCE. In an exemplary implementation of the following description, the number of interference signals is one.

The coder 702 codes decoded data (that is, decoded bits of interference burst) of a burst that is judged as an interference signal. The decoded data can be either received from a corresponding neighbor sector or acquired by decoding a received signal with interference burst information (that is, resource allocation information, a subchannel scheme, an MSC level, etc.). The modulator 704 modulates the coded data received from the coder 702. The subchannel mapper 706 rearranges the modulated data received from the modulator 704 in compliance with a subchannel scheme. The scrambler 708 scrambles the data received from the subchannel mapper 706 with a code allocated to a corresponding neighbor sector.

The multiplier 710 multiplies the channel estimation values of the interference signal received from the channel estimator 700 by the data from the scrambler 708 and generates an interference signal. The subtracter 712 subtracts the interference signal of the multiplier 710 from the OFDM demodulated signal of the switch 616. That is, the subtracter 712 cancels the interference signal from the received signal and provides the interference-canceled signal to the descrambler 622. Alternatively, if it is not possible to perform channel estimation for an interference signal, the subtracter 712 does not perform an interference cancellation operation and outputs the OFDM demodulated signal received from the switch 616 as it is in order to prevent degradation caused by a channel estimation error.

The descrambler 622 to the decoder 630 restore the signal provided from the interference canceller 620, to original information data. If there is an inverse matrix $((P^H P)^{-1})$ of a matrix $(P^H P)$ for a $k^{th}$ tile, the channel compensator 626 performs channel estimation for the interference-canceled signal from the subtracter 712 and performs channel compensation using the channel estimation value of the interference-canceled signal. The demodulator 628 creates LLR data by demodulating the channel-compensated data from the channel compensator 626 with a noise variance value. The noise variance value is determined as a mean noise power value for the interference-canceled signal.

If there is no inverse matrix $((P^H P)^{-1})$ for the $k^{th}$ tile, the channel compensator 626 performs channel estimation for an interference-noncanceled signal and performs channel compensation using the channel estimation value of the interference-noncanceled signal. The demodulator 628 creates LLR data by demodulating the channel-compensated data from the channel compensator 626 using a noise variance value. The noise variance value is determined as a total sum of the mean noise power value and a mean interference power value of at least one interference signal.

Figure 8:
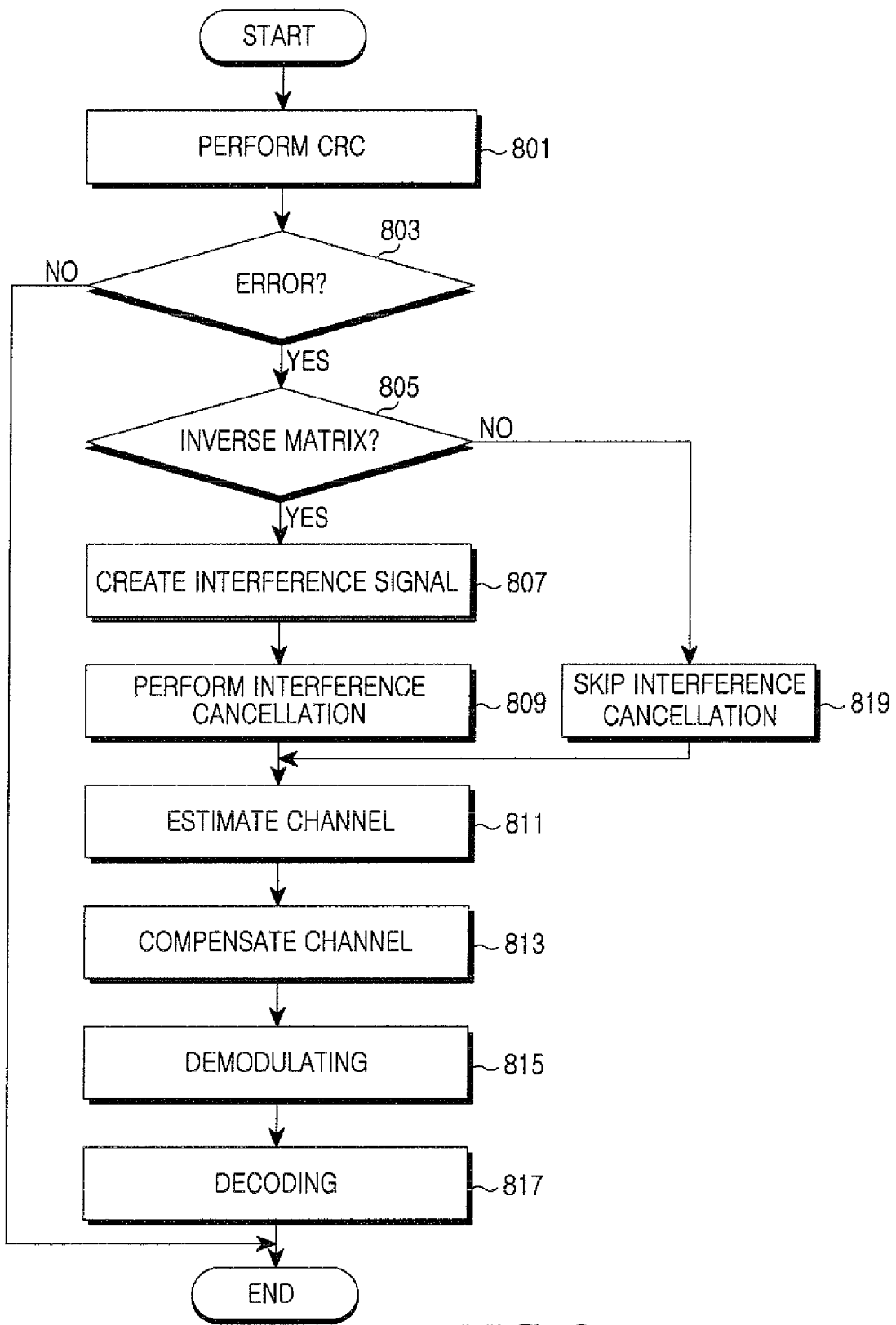
FIG. 8 is a flow diagram illustrating a process of a receiver in a BWA system according to another exemplary embodiment of the present invention.

FIG. 8 is a flow diagram illustrating a process of a receiver in a BWA system according to another exemplary embodiment of the present invention.

Referring to FIG. 8, the receiver restores a received signal to an information bit stream through channel compensation, demodulation, and decoding and performs a CRC in step 801. Then, from the CRC result, the receiver determines whether an error occurs in received data (that is, a received burst) in step 803.

If the error does not occur, the receiver terminates the process. If the error occurs, the receiver configures a 'P' matrix for JCE on a per-tile basis and determines whether there is an inverse matrix $((P^H P)^{-1})$ of a matrix $(P^H P)$ in step 805.

If there is no inverse matrix $((P^H P)^{-1})$, the receiver skips interference cancellation for a received signal (that is, an OFDM demodulated signal) in step 819 and then proceeds to step 811. If there is an inverse matrix $((P^H P)^{-1})$, the receiver estimates a channel of an interference signal using the inverse matrix $((P^H P)^{-1})$ and creates an interference signal using the estimated channel estimation value of the interference signal and decoded data of a corresponding interfering sector in step 807. The decoded data can be either received from the corresponding neighbor sector or, in another example, acquired by decoding a received signal by previously known information (that is, resource allocation information, a subchannel scheme, an MCS level, etc.). The interference signal can be created as many times as the number of detected interference signals. After the interference signal is created, the receiver creates an interference-canceled signal by subtracting the interference signal from the received signal (that is, the OFDM demodulated signal) in step 809 and then proceeds to the step 811.

The receiver performs channel estimation for each of data of an interference-canceled tile (step 809) and data of an interference-noncanceled tile (step 819) in the step 811. The receiver channel-compensates the data of each tile using the corresponding channel estimation values in step 813.

In step 815, the receiver calculates a mean noise power for the interference-canceled signal, calculates a noise variance value using the mean noise power value and demodulates the channel-compensated data with the noise variance value. In the case of the interference-canceled tile, the noise variance value is determined as the mean noise power value as above. In the case of the interference-noncanceled tile, the noise variance value is determined as a total sum of the mean noise power value and a mean interference power value of at least one interference signal. Then, the receiver decodes LLR values created through the demodulation in step 817 and then terminates the process.

As described above, exemplary embodiments of the present invention have an advantage in that reception performance of a receiver can be improved by performing channel estimation taking into consideration interference in a multi cell wireless communication system suffering inter-cell or inter-sector interference. Exemplary embodiments of the present invention also have an advantage in that accurate noise estimation is achieved by estimating even a channel of an interference signal together through JCE. The accurate noise estimation leads to improvement of the reliability of an LLR created by a demodulator. Exemplary embodiments of the present invention can directly create an interference signal using an estimated channel of an interference signal and directly cancel interference from a received signal, thereby improving demodulation performance. As such, exemplary embodiments of the present invention can improve the reception performance of the receiver by using an interference control technique, increasing a cell capacity.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A receiving apparatus in a wireless communication system, the apparatus comprising:
    an estimator for estimating channels of a desired signal and at least one interference signal through a Joint Channel Estimation (JCE), for estimating noise using the channel estimation values of the desired signal and the at least one interference signal, for calculating a mean interference power of each interference signal using the channel estimation value of the at least one interference signal, and for calculating a mean noise power using the noise estimation value;
    a channel compensator for channel-compensating burst data using the channel estimation value of the desired signal received from the estimator; and
    a demodulator for calculating a noise variance value by adding the mean noise power to the at least one mean interference power, and for creating Log Likelihood Ratio (LLR) data by demodulating the channel-compensated data using the noise variance value.

2. The apparatus of claim 1, wherein the estimator configures a 'P' matrix for the JCE using pilot patterns of the desired signal and the at least one interference signal and performs channel estimation using the 'P' matrix and a pilot received signal.

3. The apparatus of claim 2, wherein the pilot patterns comprise at least one of a position of a pilot symbol and a scrambling code masked for pilot symbols.

4. The apparatus of claim 1, further comprising:
an Orthogonal Frequency Division Multiplexing (OFDM) demodulator for processing received data by Fast Fourier Transform (FFT) operation and for providing the processed data to the estimator and a descrambler;
the descrambler for descrambling the data from the OFDM demodulator with a unique code allocated to each sector; and
a subchannel demapper for extracting the burst data seeking demodulation from the data from the descrambler and for providing the extracted data to the channel compensator.

5. The apparatus of claim 1, further comprising:
a decoder for soft-decision decoding the LLR data from the demodulator.

6. The apparatus of claim 1, wherein the estimator performs the JCE in a set size unit and, if the JCE cannot be performed, estimates the channel of the desired signal with a pilot pattern of a desired sector.

7. The apparatus of claim 6, wherein the set size comprises at least one of at least one tile and at least one slot.

8. The apparatus of claim 6, wherein the estimator calculates the mean interference power of each interference signal and the mean noise power in a burst unit.

9. The apparatus of claim 1, wherein, when a number of sectors is 3 and a number of pilot symbols within a set size unit is 4, the estimator performs the JCE using the Equation:

$$\hat{h} = (P^H P)^{-1} P^H Y$$

$$P = \begin{bmatrix} P_0(0) & P_1(0) & P_2(0) \\ P_0(1) & P_1(1) & P_2(1) \\ P_0(2) & P_1(2) & P_2(2) \\ P_0(3) & P_1(3) & P_2(3) \end{bmatrix}$$

where,
$P_c(k)$ is a scrambling code value applied to $k^{th}$ pilot tone of $c^{th}$ sector,
Y is a pilot received signal vector, and
$\hat{h}$ is a vector comprised of channel estimation values of sectors.

10. A receiving apparatus in a wireless communication system, the apparatus comprising:
an estimator for estimating a channel of an interference signal by performing a Joint Channel Estimation (JCE) in a set size unit;
a creator for creating an interference signal using the channel estimation value of the interference signal and decoded data of a corresponding interference burst;
an interference canceller for, depending on the JCE result, at least one of outputting an interference-canceled signal by canceling the created interference signal from a received signal and directly outputting the received signal; and
a data restoration unit for calculating a noise variance value by adding a mean noise power value for the interference-canceled signal to at least one mean interference power value acquired through the JCE, and, upon receiving an interference-noncanceled signal from the interference canceller, and for creating LLR data by demodulating the interference-noncanceled signal using the noise variance value.

11. The apparatus of claim 10, wherein the estimator configures a 'P' matrix for the JCE using pilot patterns of a desired signal and at least one interference signal and performs channel estimation using the 'P' matrix and a pilot received signal.

12. The apparatus of claim 11, wherein the pilot pattern comprises at least one of a position of a pilot symbol and a scrambling code masked for pilot symbols.

13. The apparatus of claim 10, wherein, when a number of sectors is 3 and a number of pilot symbols within a set size unit is 4, the estimator performs the JCE using the Equation:

$$\hat{h} = (P^H P)^{-1} P^H Y$$

$$P = \begin{bmatrix} P_0(0) & P_1(0) & P_2(0) \\ P_0(1) & P_1(1) & P_2(1) \\ P_0(2) & P_1(2) & P_2(2) \\ P_0(3) & P_1(3) & P_2(3) \end{bmatrix}$$

where,
$P_c(k)$ is a scrambling code value applied to $k^{th}$ pilot tone of $c^{th}$ sector,
Y is a pilot received signal vector, and
$\hat{h}$ is a vector comprised of channel estimation values of sectors.

14. The apparatus of claim 10, wherein the set size comprises at least one of at least one tile and at least one slot.

15. The apparatus of claim 10, wherein the creator comprises:
a coder for coding the decoded data;
a modulator for modulating the coded data from the coder;
a subchannel mapper for rearranging the modulated data from the modulator in compliance with a subchannel scheme;
a scrambler for scrambling the data from the subchannel mapper with a code allocated to a corresponding interfering sector; and
a multiplier for generating an interference signal by multiplying the data from the scrambler by the channel estimation value of the interference signal from the estimator.

16. The apparatus of claim 10, wherein the data restoration unit further comprises:
a descrambler for descrambling a signal from the interference canceller;
a subchannel demapper for arranging the data from the descrambler in compliance with a subchannel scheme;
a channel compensator for channel-compensating the data from the subchannel demapper;
a demodulator for dividing the data from the channel compensator into interference-canceled first data and interference-noncanceled second data, for demodulating the first data using the mean noise power value to create the LLR data, and for demodulating the second data using the noise variance value to create the LLR data; and
a decoder for decoding the LLR data from the demodulator.

17. The apparatus of claim 10, further comprising:
a receiver for decoding a received signal by a normal path to restore an information bit stream; and
an error checker for performing an error determination for the information bit stream and, if there is an error, for enabling a path for interference cancellation.

18. A receiving method in a wireless communication system, the method comprising:
estimating channels of a desired signal and at least one interference signal by performing a Joint Channel Estimation (JCE) in a set size unit;

estimating noise using the channel estimation value of the desired signal and the channel estimation value of the at least one interference signal;

calculating a mean interference power of each interference signal using the channel estimation value of the interference signal and calculating a mean noise power using the noise estimation value;

channel-compensating received burst data using the channel estimation value of the desired signal;

calculating a noise variance value by adding the mean noise power to the at least one mean interference power; and demodulating the channel-compensated data using the noise variance value to creates Log Likelihood Ratio (LLR) data.

19. The method of claim 18, wherein the channel estimating comprises:

configuring a matrix for the JCE using pilot patterns of a desired signal and at least one interference signal; and performing channel estimation using the matrix and received data of a pilot position.

20. The method of claim 19, wherein the channel estimating further comprises:

when the JCE cannot be performed, estimating the channel of the desired signal using a pilot pattern of a desired sector.

21. The method of claim 19, wherein the pilot pattern comprises at least one of a position of a pilot symbol and a scrambling code masked for pilot symbols.

22. The method of claim 18, further comprising:

processing received data by Fast Fourier Transform (FFT) operation for Orthogonal Frequency Division Multiplexing (OFDM) demodulation;

descrambling the OFDM demodulated data with a unique code allocated to each sector; and extracting the burst data from the descrambled data.

23. The method of claim 18, further comprising:

soft-decision decoding the LLR data.

24. The method of claim 18, wherein the set size comprises at least one of at least one tile and at least one slot.

25. The method of claim 18, wherein the mean interference power and the mean noise power are calculated in a burst unit.

26. The method of claim 18, wherein, when number of sectors is 3 and number of pilot symbols within a set size unit is 4, the JCE is performed using the Equation:

$$\hat{h} = (P^H P)^{-1} P^H Y$$

$$P = \begin{bmatrix} P_0(0) & P_1(0) & P_2(0) \\ P_0(1) & P_1(1) & P_2(1) \\ P_0(2) & P_1(2) & P_2(2) \\ P_0(3) & P_1(3) & P_2(3) \end{bmatrix}$$

where, $P_c(k)$ is a scrambling code value applied to $k^{th}$ pilot tone of $c^{th}$ sector, Y is a pilot received signal vector, and $\hat{h}$ is a vector comprised of channel estimation values of sectors.

27. A receiving method in a wireless communication system, the method comprising:

estimating a channel of an interference sector by performing a Joint Channel Estimation (JCE) in a set size unit;

creating an interference signal using the channel estimation value of the interference sector and decoded data of a corresponding interfering sector;

switching an interference cancellation operation for a received signal depending on the outcome of the JCE;

calculating a noise variance value by adding a mean noise power value for an interference-canceled signal to at least one mean interference power value acquired through the JCE; and decoding the received signal using the noise variance value to create LLR data for which the interference cancellation operation is switched off.

28. The method of claim 27, wherein the channel estimating comprises:

configuring a matrix for the JCE using pilot patterns of a desired signal and at least one interference signal; and performing channel estimation using the matrix and a pilot received signal.

29. The method of claim 28, wherein the pilot pattern comprises at least one of a position of a pilot symbol and a scrambling code masked for pilot symbols.

30. The method of claim 27, wherein, when a number of sectors is 3 and a number of pilot symbols within a set size unit is 4, the JCE is performed using the Equation:

$$\hat{h} = (P^H P)^{-1} P^H Y$$

$$P = \begin{bmatrix} P_0(0) & P_1(0) & P_2(0) \\ P_0(1) & P_1(1) & P_2(1) \\ P_0(2) & P_1(2) & P_2(2) \\ P_0(3) & P_1(3) & P_2(3) \end{bmatrix}$$

where, $P_c(k)$ is a scrambling code value applied to $k^{th}$ pilot tone of $c^{th}$ sector, Y is a pilot received signal vector, and $\hat{h}$ is a vector comprised of channel estimation values of sectors.

31. The method of claim 27, wherein the set size comprises at least one of at least one tile and at least one slot.

32. The method of claim 27, wherein the creating of the interference signal comprises:

coding and modulating the decoded data;

rearranging the modulated data in compliance with a subchannel scheme;

scrambling the rearranged data with a code allocated to a corresponding interfering sector; and generating an interference signal by multiplying the scrambled data by the channel estimation value of the interference signal.

33. The method of claim 27, wherein the creating of the LLR data comprises:

descrambling an interference-canceled signal and an interference-noncanceled signal with a unique code allocated to each sector;

arranging the descrambled data in compliance with a subchannel scheme;

channel-compensating the arranged data;

dividing the channel-compensated data into interference-canceled first data and interference-noncanceled second data;

demodulating the first data using the mean noise power value to create the LLR data; and demodulating the second data using the noise variance value to create the LLR data.

34. The method of claim 33, further comprising:
decoding the LLR data to restore an information bit stream.

35. The method of claim 27, further comprising:
decoding the received signal by a normal path to restore an information bit stream; and
performing an error check for the information bit stream and, if there is an error, enabling a path for the interference cancellation.

* * * * *